United States Patent
Liu et al.

(10) Patent No.: US 9,036,533 B2
(45) Date of Patent: May 19, 2015

(54) WIRELESS COMMUNICATION SYSTEM, AND BASE STATION AND RELAY STATION FOR THE WIRELESS COMMUNICATION SYSTEM

(75) Inventors: Shu-Tsz Liu, Taipei (TW); Kanchei Loa, Taipei (TW)

(73) Assignee: Acer Incorporated, New Taipei (TW)

( * ) Notice: Subject to any disclaimer, the term of this patent is extended or adjusted under 35 U.S.C. 154(b) by 476 days.

(21) Appl. No.: 13/050,914

(22) Filed: Mar. 17, 2011

(65) Prior Publication Data

US 2011/0228719 A1    Sep. 22, 2011

Related U.S. Application Data

(60) Provisional application No. 61/315,029, filed on Mar. 18, 2010.

(51) Int. Cl.
| | |
|---|---|
| H04B 7/14 | (2006.01) |
| H04B 7/155 | (2006.01) |
| H04W 72/04 | (2009.01) |
| H04B 7/26 | (2006.01) |
| H04W 16/26 | (2009.01) |
| H04W 84/04 | (2009.01) |

(52) U.S. Cl.
CPC ........ *H04B 7/15542* (2013.01); *H04B 7/15557* (2013.01); *H04B 7/2606* (2013.01); *H04W 16/26* (2013.01); *H04W 72/04* (2013.01); *H04W 84/047* (2013.01)

(58) Field of Classification Search
None
See application file for complete search history.

(56) References Cited

U.S. PATENT DOCUMENTS

| | | | |
|---|---|---|---|
| 2008/0002631 A1 | 1/2008 | Ramachandran | |
| 2009/0011784 A1 | 1/2009 | Kang et al. | |
| 2009/0201846 A1 | 8/2009 | Horn et al. | |
| 2009/0245198 A1 | 10/2009 | Tiirola et al. | |
| 2009/0296609 A1* | 12/2009 | Choi et al. | 370/281 |
| 2010/0034135 A1* | 2/2010 | Kim et al. | 370/315 |
| 2010/0150022 A1* | 6/2010 | Cai et al. | 370/254 |
| 2010/0158142 A1* | 6/2010 | Yu et al. | 375/260 |
| 2010/0159935 A1* | 6/2010 | Cai et al. | 455/450 |
| 2010/0232347 A1* | 9/2010 | Yu et al. | 370/315 |
| 2010/0232546 A1* | 9/2010 | Yu et al. | 375/300 |

(Continued)

FOREIGN PATENT DOCUMENTS

| | | | |
|---|---|---|---|
| CN | 101340235 A | | 1/2009 |
| WO | WO/2009/106616 | * | 9/2009 |

OTHER PUBLICATIONS

3GPP TSG-RAN WG2 #66, Tdoc R2-092953, Ericsson, Termination of the S1/X2 interfaces in relay node, May 4, 2009, 5 pages.

(Continued)

*Primary Examiner* — Brian Roberts
(74) *Attorney, Agent, or Firm* — Skaar Ulbrich Macari, P.A.

(57) ABSTRACT

A wireless communication system is disclosed. The wireless communication system comprises a core network, a base station and a relay station. The relay station transmits a first message with a system resource information of the relay station to the base station. The base station generates a configuration pattern according to the system resource information of the relay station, and transmits a second message with the configuration pattern to the relay station. The configuration pattern is used to divide the radio resource unit of the wireless communication system into a first set and a second set. Therefore, the base station transmits a first signal to the relay station through the first set, and the relay station transfers a second signal with a user equipment through the second set.

22 Claims, 8 Drawing Sheets

(56) References Cited

U.S. PATENT DOCUMENTS

2011/0128893 A1* 6/2011 Park et al. ............... 370/279
2011/0244787 A1* 10/2011 Kim et al. ................ 455/7

OTHER PUBLICATIONS

Office Action by the Chinese patent office (SIPO) for the Chinese counterpart application to the present US application, Apr. 28, 2013, 7 pages.

Etri, "Considerations on R-PDCCH multi-plexing", 3GPP TSG RAN WG1, R1-094490, Nov. 13, 2009, 2 pages.

Office Action by the Chinese patent office (SIPO) for the Chinese counterpart application to the present US application, Sep. 27, 2013, 7 pages.

Office Action by the Taiwan patent office (TIPO) for the Chinese counterpart application to the present US application, Apr. 20, 2013, 11 pages.

* cited by examiner

WIRELESS COMMUNICATION SYSTEM, AND BASE STATION AND RELAY STATION FOR THE WIRELESS COMMUNICATION SYSTEM

PRIORITY

This application claims the priority benefit of U.S. Provisional Application Ser. No. 61/315,029 filed on Mar. 18, 2010, which is hereby incorporated by reference herein in its entirety.

FIELD

The present invention relates to a wireless communication system. More particularly, the present invention relates to a wireless communication system having a base station and a relay station, in which the base station divides a radio resource unit of the wireless communication system according to the system resource information of the relay station.

BACKGROUND

Nowadays, wireless network technologies have been utilized widely. In order to provide different qualities of service (QoS) in different environments, various network protocols have been developed. Among these network protocols, WiMAX (Worldwide Interoperability for Microwave Access) and LTE (Long Term Evolution) have become popular wireless network system specifications.

In existing wireless networks, a particular management system (e.g., an Element Management System (EMS) or an Operation and Maintenance (O&M) system) of the core network configures operations of base stations and relay stations respectively during installation of base stations and relay stations.

Furthermore, to improve performance of the whole wireless system, relay stations now perform most of functions that were previously possessed by base stations only. In this case, a base station can provide communication between a relay station and a core network. However, there is no particular protocol mechanism between the base station and the relay station, which allows them to learn operation modes of each other. As a result, the management system of the core network is unaware of the signal transmission conditions between the base station and the relay station or the load conditions of the both when allocating radio resources of the wireless system to the base station and to the relay station. Therefore, it would be impossible to achieve an optimal transmission efficiency in signal transmissions between the base station, the relay station and user equipment (UE).

Moreover, in the existing wireless networks, manual adjustment via the management system of the core network is required when it is desired to change allocation of the radio resources.

On the other hand, when the base station needs to use the same radio resources for other applications (e.g., broadcasting) without coordinating allocations of the radio resources, a collision in use of the radio resources might be caused between the base station and the relay station.

Accordingly, significant efforts are still required in the art to establish a particular protocol mechanism for appropriately allocating radio resources to base stations and relay stations in a dynamic way.

SUMMARY

An objective of certain embodiments of the present invention is to provide a wireless communication system, which has a particular protocol mechanism for allocating a radio resource unit to a base station and a relay station. Specifically, in the wireless communication system of certain embodiments of the present invention, the relay station transmits the system resource information thereof to the base station.

After receiving the system resource information of the relay station, the base station dynamically divides the radio resource unit into two sets for use by the base station and the relay station respectively according to the system resource information of the relay station.

To achieve the aforesaid objective, certain embodiments of the present invention include a wireless communication system which comprises a core network, a base station and a relay station. The core network is configured to provide a telecommunication service. The base station is connected to the core network in a wired way or a wireless way. The relay station, which is connected to the base station wirelessly, is configured to transmit a first message with the system resource information of the relay station to the base station.

The base station generates a configuration pattern according to the system resource information of the relay station and transmits a second message with the configuration pattern to the relay station. The configuration pattern is used to divide a radio resource unit of the wireless communication system into a first set and a second set so that the base station transmits a first signal to the relay station through the first set and the relay station transfers a second signal with a user equipment through the second set.

Certain embodiments of the present invention further include a base station for use in the aforesaid wireless communication system. The base station comprises a transceiver and a processor. The transceiver is configured to receive a first message with system resource information of a relay station from the relay station. The processor is configured to generate a configuration pattern according to the system resource information of the relay station.

The transceiver can be further configured to transmit a second message with the configuration pattern to the relay station. The configuration pattern is used to divide a radio resource unit of the wireless communication system into a first set and a second set so that the base station transmits a first signal to the relay station through the first set and the relay station transfers a second signal with a user equipment through the second set.

Certain embodiments of the present invention further include a relay station for use in the aforesaid wireless communication system. The relay station comprises a transceiver which is configured to transmit a first message with the system resource information of the relay station to the base station so that the base station generates a configuration pattern according to the system resource information of the relay station.

The transceiver is configured to receive a second message with the configuration pattern from the base station. The configuration pattern is used to divide a radio resource unit of the wireless communication system into a first set and a second set so that the base station transmits a first signal to the relay station through the first set and the relay station transfers a second signal with a user equipment through the second set.

Another objective of certain embodiments of the present invention is to provide a wireless communication system, which has a particular protocol mechanism for allocating radio resource units to a base station and a relay station. Specifically, in the wireless communication system of certain embodiments of the present invention, the base station dynamically divides the radio resource unit into two sets for use by the base station and the relay station respectively according to the system resource information.

To achieve the aforesaid objective, the certain embodiments of present invention include a wireless communication system which comprises a core network, a base station and a relay station. The core network is configured to provide a telecommunication service. The base station is connected to the core network in a wired way or a wireless way, and configured to generate a configuration pattern according to the system resource information of the base station. The relay station is connected to the base station wirelessly, and configured to receive a message with the configuration pattern from the base station. The configuration pattern is used to divide a radio resource unit of the wireless communication system into a first set and a second set so that the base station transmits a first signal to the relay station through the first set and the relay station transfers a second signal with a user equipment through the second set.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

DETAILED DESCRIPTION

Example embodiments to be described below are provided only for purpose to illustrate the present invention but not to limit the scope of the present invention. These example embodiments are not intended to limit the present invention to any specific example, embodiment, environment, applications, or particular implementations described in these example embodiments. It should be appreciated that, in the following example embodiments and the attached drawings, elements unrelated to the present invention are omitted from depiction; and dimensional relationships among individual elements in the attached drawings are illustrated only for ease of understanding, but not to limit the actual scale.

Figure 1:
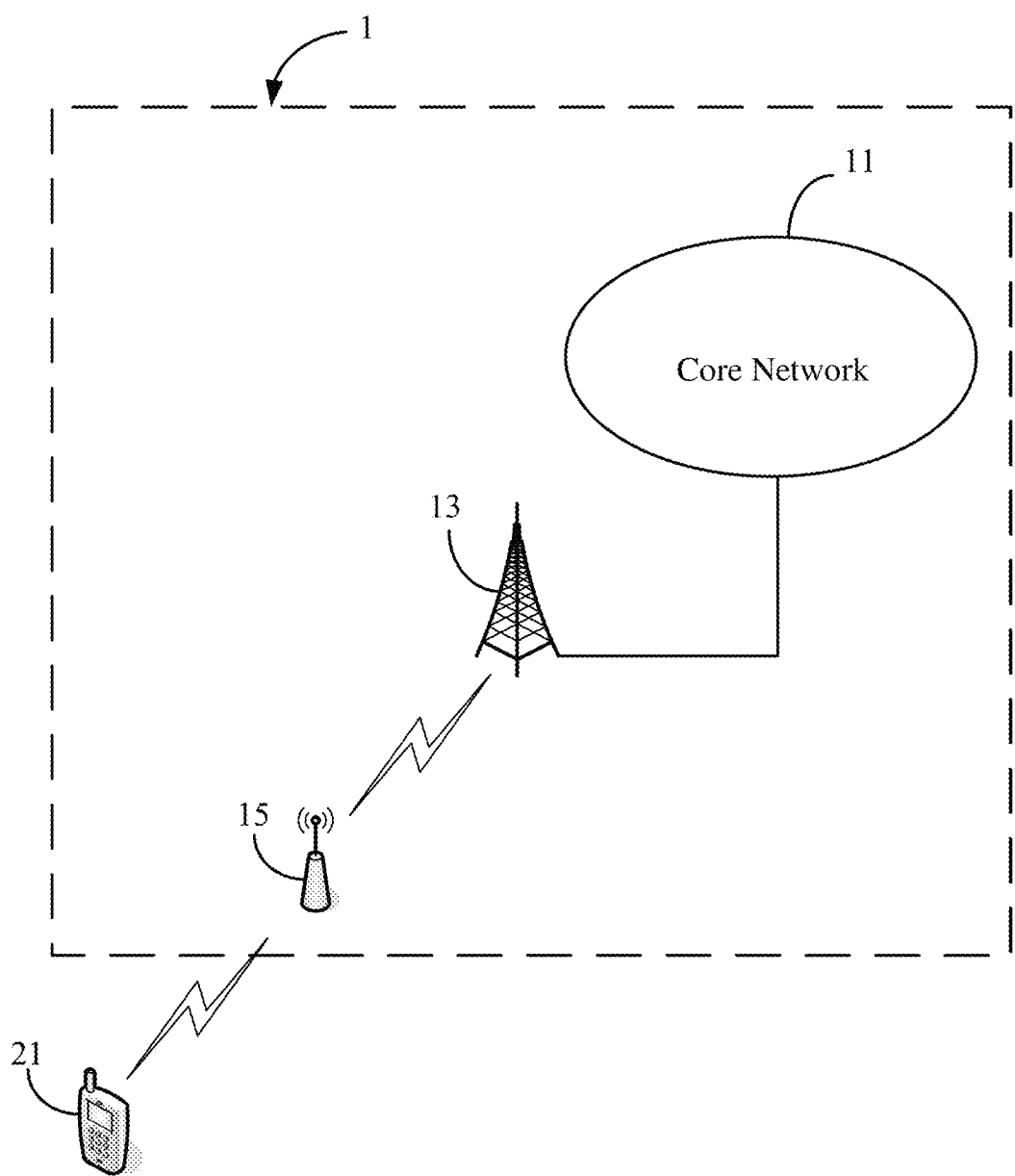
FIG. 1 is a schematic view of a wireless network system 1 according to a first example embodiment of the present invention.

A first embodiment of the present invention is as shown in FIG. 1, which depicts a wireless network system 1. The wireless network system 1 comprises a core network 11, a base station 13 and a relay station 15. The core network 11 connects to the base station 13 in a wired or wireless way, while the base station 13 connects to the relay station 15 wirelessly.

A user equipment (UE) 21 is located at a coverage of the relay station 15 and connects, via the relay station 15, to the base station 13 and further to the core network 11. The core network 11 comprises a management system and a service equipment of the telecommunication operator so as to provide a telecommunication service. The UE 21 can communicate with other UEs or connect to the Internet via the core network 11.

Figure 2:
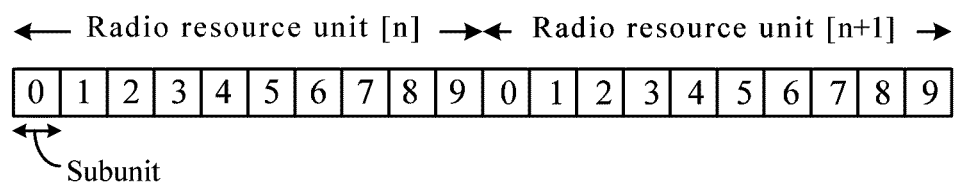
FIG. 2 is a schematic view illustrating radio resource units of the wireless network system 1.

In the wireless network system 1, the radio resources can be divided into a plurality of radio resource units according to the time sequence, as shown in FIG. 2. The radio resource unit serves as a unit of radio resources in signal transmission, and one radio resource unit represents a time interval, e.g., 10 milliseconds. Each radio resource unit may be further divided into a plurality of subunits; for example, one radio resource unit comprises 10 subunits.

The subunits are dynamically allocated by the base station 13 for the radio utilization to the base station 13 and the relay station 15 to obviate the case that the management system of a conventional core network cannot appropriately allocate the subunits.

Figure 3:
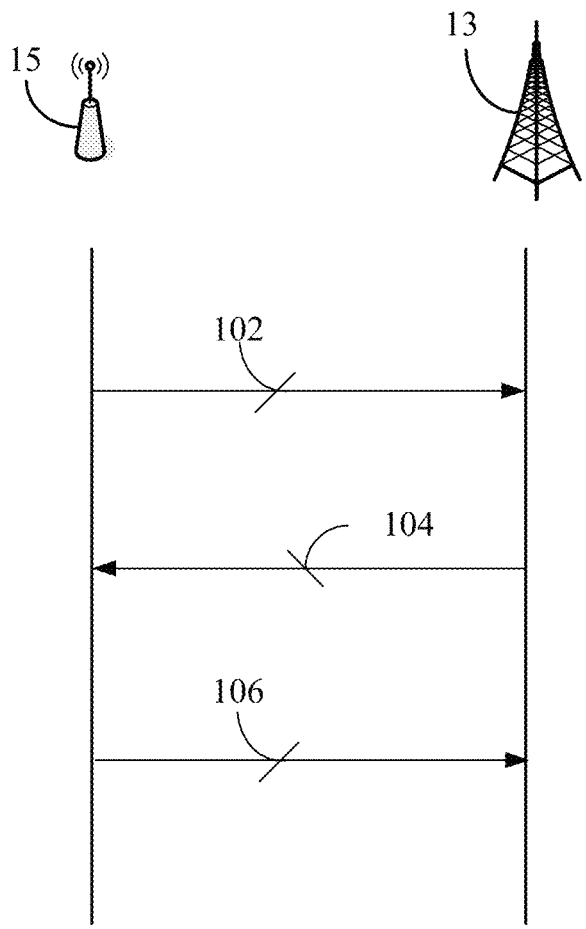
FIG. 3 depicts a protocol mechanism for configuring signal transmissions between a base station 13 and a relay station 15.

FIG. 3 depicts a protocol mechanism for configuring signal transmissions between the base station 13 and the relay station 15. Initially, the base station 13 and the relay station 15 can use all the radio resource units for communication. The relay station 15 transmits a first message 102 with the system resource information of the relay station 15 to the base station 13. The system resource information of the relay station 15 may include resource partition information, an antenna configuration, an operation frequency band configuration, a load condition and a received signal quality of the relay station 15.

Upon receiving the first message 102, the base station 13 determines whether to divide the subunits of the radio resource unit for allocation to the base station 13 and the relay station 15 according to the system resource information of the relay station 15. The relay station 15 can notify the base station 13 whether a radio resource partition is necessary via the system resource information of the relay station 15; or the base station 13 can decide that according to the system resource information of the relay station 15. In particular, if, according to the system resource information of the relay station 15, the base station 13 determines that two groups of transmission bands can be used by the relay station 15 for signal transmission with the base station 13 and a UE (e.g., the UE 21), the base station 13 will then determine that it is unnecessary to divide the subunits of the radio resource unit for allocation to the base station 13, the relay station 15 and the UE.

On the other hand, based on the system resource information of the relay station 15, if the base station 13 determines that only a single group of transmission bands can be used by the relay station 15 for signal transmission with the base station 13 and the UE, the base station 13 will determine that it is necessary to divide the subunits of the radio resource unit for allocation to the base station 13, the relay station 15 and the UE.

It shall be noted that, apart from depending on configurations (e.g., hardware functions or operation settings) of the relay station 15 itself, whether the relay station 15 can use a single group or two groups of transmission bands for signal transmission may also depend on the current transmission conditions of the relay station 15. Accordingly, the system resource information of the relay station 15 is used to provide the information related to the hardware and transmissions of the relay station 15 to the base station 13. As a result, the base station 13 can decide whether to divide the subunits of the radio resource unit.

Figure 4A:
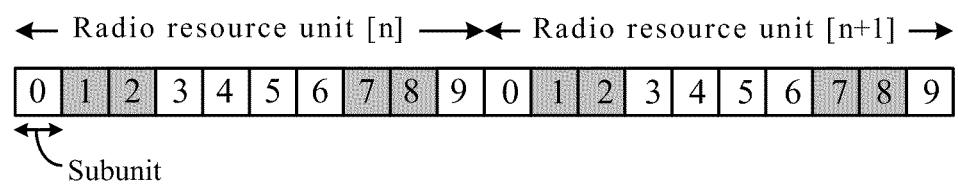
FIGS. 4A through 4B depict a configuration pattern of radio resource units of the wireless network system 1.
Figure 4B:
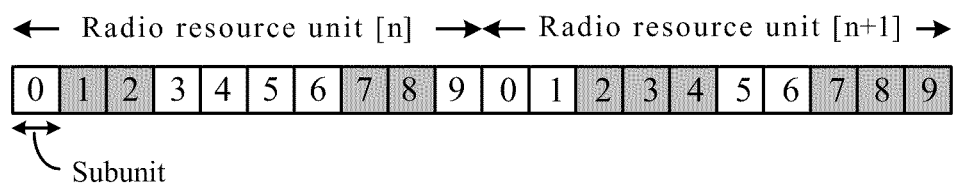

FIGS. 4A through 4B depict an exemplary example of a configuration pattern of radio resource units of the wireless network system 1. When the base station 13 determines that it is necessary to divide the subunits of the radio resource unit, the base station 13 generates a configuration pattern. The configuration pattern is used to divide a radio resource unit of the wireless network system 1 into a first set and a second set. For example, as shown in FIG. 4A, the base station 13 groups subunits No. 1, No. 2, No. 7 and No. 8 of the radio resource unit [n] into the first set, and groups the subunits No. 0, No. 3, No. 4, No. 5, No. 6 and No. 9 of the radio resource unit [n] into the second set. Within a specific period, subunits of contiguous radio resource units may have the same configuration (i.e., as shown in FIG. 4A, the subunits of the radio resource unit [n+1] have the same configuration as that of the subunits of the radio resource unit [n]), or may also have different configurations.

It shall be noted that what the serial numbers described above are only used to represent the time sequence of the subunits of the radio resource unit; i.e., the subunit No. 0 is the first subunit, and the subunit No. 9 is the last subunit. However, in other embodiments, the radio resource unit may also be divided into other similar ways. Moreover, how the radio resource unit is divided into other embodiments will be appreciated by those skilled in the art based on the above descriptions and thus will not be further described herein.

The base station 13 stores a configuration pattern set which includes a plurality of configuration patterns. The base station 13 can choose an appropriate one configuration pattern, which is suitable for the signal transmission conditions between the base station 13, the relay station 15 and the UE 21, from the configuration pattern set. However, the configuration pattern may also be generated in real time by the base station 13 according to the system resource information of the relay station 15 or the system resource information of the base station 13.

As shown in FIG. 3, after choosing or generating the configuration pattern, the base station 13 transmits a second message 104 with the configuration pattern to the relay station 15. Upon receiving the second message 104, the relay station 15 sets a transmission mode of the relay station 15 according to the configuration pattern. Then the relay station 15 transmits a third message 106 with a configuration response information to the base station 13 after the transmission mode is set.

Besides, the base station 13 is further configured to decide a control channel according to the system resource information of the relay station 15. The base station 13 further transmits the control channel information via the second message 104 to the relay station 15 (i.e., the second message 104 further comprises the control channel information). The control channel information is used to indicate the control channel.

After the transmission mode of the base station 13 and the relay station 15 are set according to the configuration pattern, the base station 13 transmits a downlink signal to the relay station 15 through the first set, and the relay station 15 transfers an uplink or a downlink signal with the UE 21 through the second set. For example, FIG. 5 depicts signal transmissions between the base station 13, the relay station 15 and the UE 21.

In detail, the first set is allocated to the base station 13 for transmitting a downlink signal (i.e., the first signal 110). Thus, after the transmission mode set according to the configuration pattern is enabled, the base station 13 only uses subunits in the first set to transmit a signal to the relay station 15. The second set is allocated to the relay station 15 for transmitting a downlink signal (i.e., the second signal 112) to the UE 21 and receiving an uplink signal (i.e., the second signal 112) from the UE 21. After the transmission mode is set according to the configuration pattern and enabled, the relay station 15 only uses subunits in the second set to transmit a signal to the UE 21 and receive a signal from the UE 21.

Figure 5:
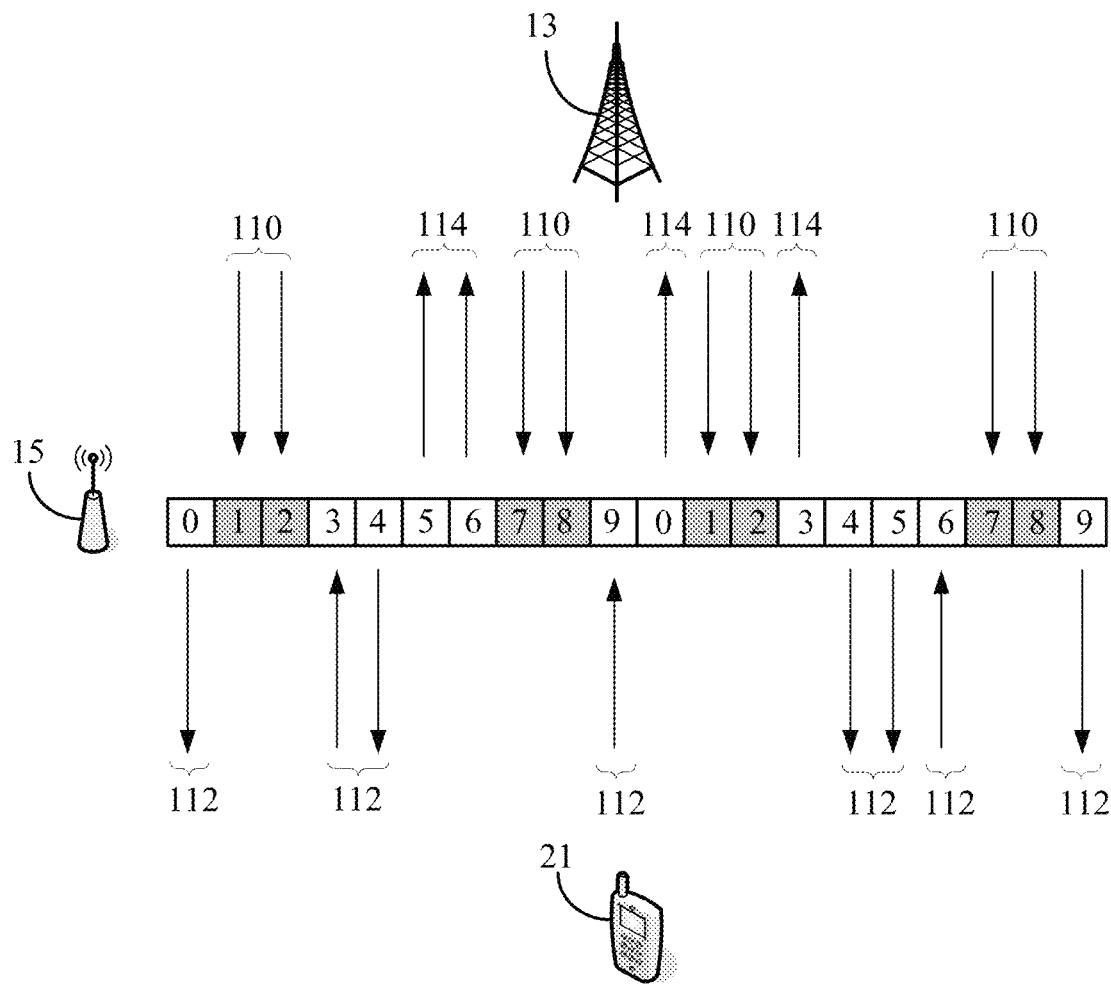
FIG. 5 depicts message transmissions between the base station 13, the relay station 15 and a user equipment 21.

Further, the relay station 15 may use subunits in the first set or in the second set to transmit the uplink signal to the base station 13, which depends on different characteristics of the wireless network system (e.g., the third signal 114 in FIG. 5 is transmitted by means of subunits of the second set). In other embodiments, the UE 21 can be another relay station, and the relay station 15 may play the role of a base station for another relay station that it accesses. In this case, the signal and data transmission mechanism between the base station 13, the relay station 15 and the other relay station is substantially the same as what described above.

Furthermore, the base station 13 can generate a configuration pattern according to the system resource information of itself (e.g., an antenna configuration, an operation frequency band configuration, a load condition, a received signal quality and a broadcast request), or re-choose a configuration pattern from the configuration pattern set. As a result, the base station 13 can re-divide the radio resource unit into a new first set and a new second set. Then, a message with the new configuration pattern is carried by the first signal 110 to the relay station 15.

As shown in FIG. 4B, according to the system resource information of itself, the base station 13 changes the original dividing scheme of the radio resource units by grouping the subunits No. 2, No. 3, No. 4, No. 7, No. 8 and No. 9 of the radio resource unit [n+1] into a new first set and grouping the subunits No. 0, No. 1, No. 5, and No. 6 of the radio resource unit [n+1] into a new second set.

In other words, upon receiving a message with the new configuration pattern, the relay station 15 changes the setting of the transmission mode according to the new configuration pattern. Subsequently, the base station 13 and the relay station 15 transmit signals according to the transmission mode that is set by the new configuration pattern, as shown in FIG. 4B. Thereby, the base station 13 will use subunits in the new first set to transmit a signal to the relay station 15, and the relay station 15 will use subunits in the new second set to transmit a signal to and receive a signal from the UE 21.

The transmission mode is set by the configuration pattern to transmit signals by use of the new first set and the new second set. It is to be understood and appreciated that it is unnecessary for the base station 13 and the relay station 15 to immediately enable the transmission mode after the relay station 15 has set the transmission mode of the relay station 15 according to the configuration pattern.

For example, the base station 13 may notify the relay station 15 to enable the transmission mode after elapse of a specific time period (e.g., 10 seconds) via the second message 104. At this time, the relay station 15 consequently uses the transmission mode, which is set according to the configuration pattern, to transmit signals from and to the base station 13.

Additionally, according to the system operation information of itself, the relay station 15 may also decide when to enable the transmission mode set according to the configuration pattern to perform signal transmissions with the base station 13 and/or the UE 21. In other words, the base station 13 can decide when the base station 13 and the relay station 15 enable the transmission mode set according to the configuration pattern to perform signal transmission.

The relay station 15 can also decide when the relay station 15 and the base station 13 and/or the UE 21 enable the transmission mode set according to the configuration pattern to perform signal transmission. Accordingly, any time point, on which a transmission mode is enabled to perform signal transmissions between the base station 13, the relay station 15 and the UE 21, shall fall within the scope of the present invention.

Figure 6:
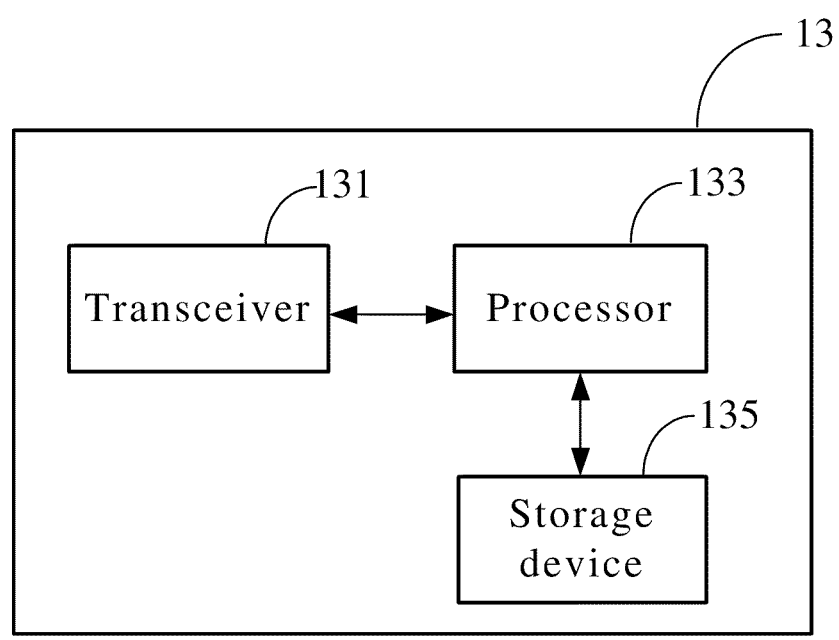
FIG. 6 is a schematic view of the base station 13 of the present invention.

FIG. 6 depicts the base station 13 comprising a transceiver 131, a processor 133 and a storage device 135. The transceiver 131 is configured to receive the first message 102 and the third message 106 from the relay station 15 and transmit the second message 104 to the relay station 15. The processor 133 is configured to generate a configuration pattern according to the system resource information of the relay station 15 carried by the first message 102. The storage device 135 is configured to store the configuration pattern set.

The processor 133 is also configured to generate a configuration pattern in real time or choose from the configuration pattern set. Also, the processor 133 is further configured to decide the control channel information according to the system resource information of the relay station 15.

After the base station 13 and the relay station 15 have set the transmission mode according to the configuration pattern and enabled it, the transceiver 131 is further configured to transmit a downlink signal (i.e., the first signal 110) to the relay station 15 and receive an uplink signal (i.e., the third signal 114) from the relay station 15. The uplink data from the relay station 15 to the base station 13 may include the system resource information of the relay station 15, the configuration response and other uplink data.

The downlink data from the base station 13 to the relay station 15 may include the configuration pattern, the control channel information and other downlink data. In other words, after the transmission mode has been set, the base station 13 and the relay station 15 can continuously transmit the system resource information of the relay station 15, the configuration response, the configuration pattern and the control channel information via the first signal 110 and the third signal 114 to change the transmission mode in real time.

Figure 7:
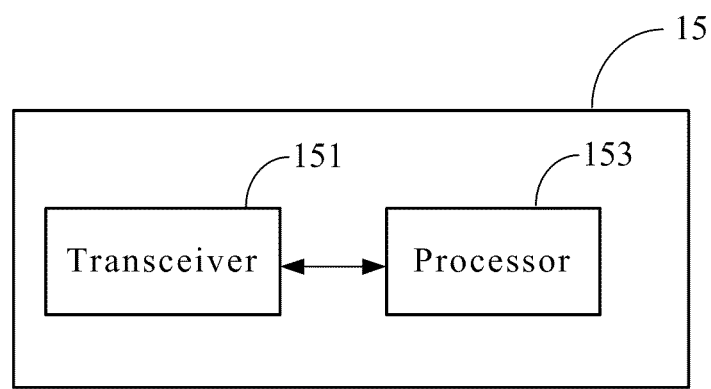
FIG. 7 is a schematic view of the relay station 15 of the present invention.

FIG. 7 depicts the relay station 15 comprising a transceiver 151 and a processor 153. The transceiver 151 is configured to transmit the first message 102 and the third message 106 to the base station 13 and receive the second message 104 from the base station 13. According to the configuration pattern carried by the second message 104, the processor 153 is configured to set the transmission mode of the relay station 15 so that the transceiver 151 transmits the third message 106 to the base station 13 after the transmission mode is set.

The processor 153 further monitors the control channel decided by the base station 13 according to the control channel information carried by the second message 104. It shall be noted that, in other embodiments, if the UE 21 is another relay station, a storage device may also be provided in the relay station 15 to serve the same function as what described above.

After the base station 13 and the relay station 15 have set the transmission mode according to the configuration pattern and enabled it, the transceiver 151 is further configured to transmit a downlink signal (i.e., the second signal 112) to the UE 21 and receive an uplink signal (i.e., the second signal 112) from the UE 21. On the other hand, the transceiver 151 further transmits an uplink signal (i.e., the third signal 114) to the base station 13 and receives a downlink signal (i.e., the first signal 110) from the base station 13.

A second embodiment of the present invention is a wireless communication system complying with the Long Term Evolution (LTE) specification. In the LTE specification, the core network is an Evolved Packet Core (EPC) network, which may comprise a Mobility Management Entity (MME), a Serving Gateway (S-GW) and a Packet Data Network Gateway (P-GW). The base station 13 that can be accessed by the relay station 15 is usually called a Donor eNB or DeNB, while the relay station 15 is usually called a Relay Node, a Relay eNB or a ReNB. An Evolved UTRAN (EUTRAN) may comprise an EPC network and a base station. If the UE 21 is a relay station, the EUTRAN may also comprise the relay station 15.

Figure 8:
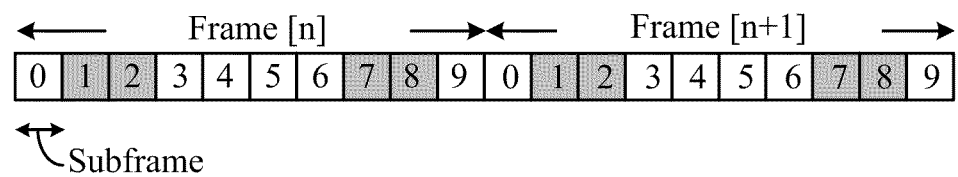
FIG. 8 depicts a configuration pattern of frames of the wireless network system.

In the LTE specification, the radio resource unit is a frame, which comprises a specified number of subframes, as shown in FIG. 8. The first set comprises a first number of subframes and the second set comprises a second number of subframes, with a sum of the first number and the second number being equal to a specified number (e.g., 10 subframes).

Taking the frame [n] and the frame [n+1] as an example, the first set comprises subframes No. 1, No. 2, No. 7 and No. 8, and the second set comprises subframes No. 0, No. 3, No. 4, No. 5, No. 6 and No. 9. In particular, in the LTE specification, the first number of subframes in the first set belong to subframes that are defined in the Multicast/Broadcast Single-frequency Network (MBSFN), and are for use by the base station 13 to transmit a downlink signal to the relay station 15.

At the outset, the base station 13 and the relay station 15 use all subframes for communication. The relay station 15 uses a radio resource control (RRC) interface to transmit the first message 102, which carries the system resource information of the relay station 15 to the base station 13. Meanwhile, in this case, the second message 104 is also an RRC message, which may be any of the specific RRC messages that have been specified in the LTE specification (e.g., the RRCConnectionReconfiguration message) or a new RRC message (e.g., an RNReconfiguration message). Additionally, the RRC message defines a system information block (SIB), and the base station 13 and the relay station 15 can communicate respective system information with each other through the specific RRC message or the new RRC message.

Furthermore, an S1 interface or an X2 interface may also be established between the base station 13 and the relay station 15 so that the relay station 15 can use an S1 message or an X2 message to transmit the system resource information of the relay station 15 to the base station 13. Specifically, each of the first message 102, the second message 104 and the third message 106 may be one of an RRC message, an S1 message and an X2 message. Therefore, the base station 13 may use one of the RRC message, the S1 message and the X2 message to carry the configuration pattern and the control channel information to the relay station 15, and the relay station 15 may use one of the RRC message, the S1 message and the X2 message to carry information.

One or a combination of an RRC interface, an S1 interface and an X2 interface may be used between the base station 13 and the relay station 15, and the specific or new message is used to transfer information between the base station 13 and the relay station 15. As the RRC interface, the S1 interface and the X2 interface have been well known, they will not be further described herein.

Furthermore, in the LTE specification, the control channel is one of a Relay Physical Downlink Control Channel (R-PDCCH) and a Physical Downlink Control Channel (PDCCH). In general cases, when it is unnecessary to divide the subframes of the frame for allocation to the base station 13 and the relay station 15 (i.e., when the transmission mode, which is set according to the configuration pattern, is not enabled), the relay station 15 will monitor the PDCCH to retrieve the control information transmitted by the base station 13. On the other hand, when it is necessary to divide the subframes of the frame for allocation to the base station 13 and the relay station 15 (i.e., when the transmission mode, which is set according to the configuration pattern, is enabled), the relay station 15 may monitor the R-PDCCH or the PDCCH to retrieve the control information transmitted by the base station 13.

In other embodiments, if the UE 21 is another relay station, the function will be the same as what described above. Also, the form of the control channel is not intended to limit the present invention, and those ordinary skilled in the art will readily appreciate that the control channel is only a specific information transmission block for carrying the control information, and any transmission block capable of carrying the control information will fall within the scope of the present invention.

According to the above descriptions, the wireless communication system of the present invention has a specific protocol mechanism for allocating a radio resource unit to a base station and a relay station. By considering the signal transmission conditions in real time between the base station and the relay station or respective load conditions of the both, the base station of the present invention dynamically divides the radio resource unit for allocation to the base station and the relay station. In this way, an optimal transmission efficiency can be achieved in signal transmissions between the base station, the relay station and the user equipment.

Accordingly, the technical solutions disclosed in the present invention may be applied to any wireless communication system that divides, according to the time sequence, radio resources into a radio resource unit and a plurality of subunits to dynamically allocate the radio resources to the base station and the relay station.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A wireless communication system, comprising:
   a core network, being configured to provide a telecommunication service;
   a base station connected to the core network in a wired way or a wireless way; and
   a relay station connected to the base station wirelessly, being configured to transmit a first message with a system resource information of the relay station to the base station;
   wherein the base station generates a configuration pattern according to the system resource information of the relay station and transmits a second message with the configuration pattern to the relay station, the configuration pattern is used to divide a radio resource unit of the wireless communication system into a first set and a second set so that the base station transmits a first signal to the relay station through the first set of the radio resource unit and the relay station transfers a second signal with a user equipment through the second set of the radio resource unit and transmits a third signal to the base station through the second set of the radio resource unit, and the first set and the second set of the radio resource unit conform to a same network protocol of the wireless communication system.

2. The wireless communication system as claimed in claim 1, wherein the base station chooses the configuration pattern from a configuration pattern set.

3. The wireless communication system as claimed in claim 1, wherein the base station is further configured to determine a control channel according to the system resource information of the relay station, and the second message further includes a control channel information for indicating the control channel.

4. The wireless communication system as claimed in claim 3, wherein the relay station sets a transmission mode of the relay station according to the configuration pattern and, after the transmission mode is set, transmits a third message with a configuration response information to the base station.

5. The wireless communication system as claimed in claim 4, wherein the wireless communication system conforms with a Long-Term Evolution (LTE) specification, each of the first message, the second message and the third message is one of a radio resource control (RRC) message, an S1 message and an X2 message, and the control channel is one of a Relay Physical Downlink Control Channel (R-PDCCH) and a Physical Downlink Control Channel (PDCCH).

6. The wireless communication system as claimed in claim 5, wherein the RRC message is a message that has already been specified in the LTE specification.

7. The wireless communication system as claimed in claim 1, wherein the system resource information of the relay station is selected from a group consisting of a resource partition information, an antenna configuration, an operation frequency band configuration, a load condition and a received signal quality.

8. A base station for use in a wireless communication system, the wireless communication system comprising a core network, a relay station and the base station, the core network being configured to provide a telecommunication service, and the base station being connected to the core network in a wired way or a wireless way and connected to the relay station wirelessly, the base station comprising:
   a transceiver, being configured to receive a first message with a system resource information of the relay station; and
   a processor, being configured to generate a configuration pattern according to the system resource information of the relay station;
   wherein the transceiver is further configured to transmit a second message with the configuration pattern to the relay station, the configuration pattern is used to divide a radio resource unit of the wireless communication system into a first set and a second set so that the base station transmits a first signal to the relay station through the first set of the radio resource unit and the relay station transfers a second signal with a user equipment through the second set of the radio resource unit and transmits a third signal to the base station through the second set of the radio resource unit, and the first set and the second set of the radio resource unit conform to a same network protocol of the wireless communication system.

9. The base station as claimed in claim 8, further comprising a storage device configured to store a configuration pattern set, wherein the processor can choose the configuration pattern from the configuration pattern set.

10. The base station as claimed in claim 8, wherein the processor is further configured to determine a control channel according to the system resource information of the relay station, and the second message further includes a control channel information for indicating the control channel.

11. The base station as claimed in claim 10, wherein the transceiver further receives a third message with a configuration response information from the relay station.

12. The base station as claimed in claim 11, wherein the wireless communication system conforms with a Long-Term Evolution (LTE) specification, each of the first message, the second message and the third message is one of a radio resource control (RRC) message, an S1 message and an X2 message, and the control channel is one of an R-PDCCH and a PDCCH.

13. The base station as claimed in claim 12, wherein the RRC message is a message that has already been specified in the LTE specification.

14. The base station as claimed in claim 8, wherein the system resource information of the relay station is selected from a group consisting of a resource partition information, an antenna configuration, an operation frequency band configuration, a load condition and a received signal quality.

15. A relay station for use in a wireless communication system, the wireless communication system comprising a core network, a base station and the relay station, the core network being configured to provide a telecommunication service, the base station being connected to the core network in a wired way or a wireless way, and the relay station being connected to the base station wirelessly, the relay station comprising:
   a transceiver, being configured to transmit a first message with a system resource information of the relay station to the base station so that the base station generates a configuration pattern according to the system resource information of the relay station;
   wherein the transceiver is further configured to receive a second message with the configuration pattern from the base station, the configuration pattern is used to divide a radio resource unit of the wireless communication system into a first set and a second set so that the base station transmits a first signal to the relay station through the first set of the radio resource unit and the relay station transfers a second signal with a user equipment through the second set of the radio resource unit and transmits a third signal to the base station through the second set of the radio resource unit, and the first set and the second set of the radio resource unit conform to a same network protocol of the wireless communication system.

16. The relay station as claimed in claim 15, wherein the base station is further configured to determine a control channel according to the system resource information of the relay station, and the second message further includes a control channel information for indicating the control channel.

17. The relay station as claimed in claim 16, further comprising a processor, which is configured to set a transmission mode of the relay station according to the configuration pattern so that, after the transmission mode is set, the transceiver transmits a third message with a configuration response information to the base station.

18. The relay station as claimed in claim 17, wherein the wireless communication system conforms with a Long-Term Evolution (LTE) specification, each of the first message, the second message and the third message is one of an RRC message, an S1 message and an X2 message, and the control channel is one of an R-PDCCH and a PDCCH.

19. The relay station as claimed in claim 18, wherein the RRC message is a message that has already been specified in the LTE specification.

20. The relay station as claimed in claim 15, wherein the system resource information of the relay station is selected from a group consisting of a resource partition information, an antenna configuration, an operation frequency band configuration, a load condition and a received signal quality.

21. A wireless communication system, comprising:
   a core network, being configured to provide a telecommunication service;
   a base station connected to the core network in a wired way or a wireless way, being configured to generate a configuration pattern according to a system resource information of the base station; and
   a relay station connected to the base station wirelessly, being configured to receive a message with the configuration pattern from the base station;
   wherein, the configuration pattern is used to divide a radio resource unit of the wireless communication system into a first set and a second set so that the base station transmits a first signal to the relay station through the first set of the radio resource unit and the relay station transfers a second signal with a user equipment through the second set of the radio resource unit and transmits a third signal to the base station through the second set of the radio resource unit, and the first set and the second set of the radio resource unit conform to a same network protocol of the wireless communication system.

22. The wireless communication system as claimed in claim 21, wherein the system resource information of the base station is selected from a group consisting of an antenna configuration, an operation frequency band configuration, a load condition, a received signal quality and a broadcast request.

* * * * *